(12) United States Patent
Simoncelli et al.

(10) Patent No.: US 9,098,461 B2
(45) Date of Patent: Aug. 4, 2015

(54) LIVE SNAPSHOTS OF MULTIPLE VIRTUAL DISKS

(71) Applicants: Federico Simoncelli, Fano (IT); Ayal Baron, Kiryat Ono (IL)

(72) Inventors: Federico Simoncelli, Fano (IT); Ayal Baron, Kiryat Ono (IL)

(73) Assignee: Red Hat Israel, Ltd., Raanana (IL)

( * ) Notice: Subject to any disclaimer, the term of this patent is extended or adjusted under 35 U.S.C. 154(b) by 243 days.

(21) Appl. No.: 13/706,304

(22) Filed: Dec. 5, 2012

(65) Prior Publication Data

US 2014/0156957 A1 Jun. 5, 2014

(51) Int. Cl.
*G06F 12/00* (2006.01)
*G06F 12/16* (2006.01)

(52) U.S. Cl.
CPC ........................ *G06F 12/16* (2013.01)

(58) Field of Classification Search
CPC . G06F 12/00; G06F 11/1458; G06F 11/1461; G06F 11/1464; G06F 11/1469; G06F 11/1466

USPC .......................... 711/100, 154, 162, 163, 170
See application file for complete search history.

(56) References Cited

U.S. PATENT DOCUMENTS

| | | | |
|---|---|---|---|
| 7,890,720 B2 * | 2/2011 | Satoyama et al. | 711/162 |
| 8,250,031 B2 * | 8/2012 | Kawaguchi | 707/625 |
| 2008/0082593 A1 * | 4/2008 | Komarov et al. | 707/204 |
| 2009/0182963 A1 * | 7/2009 | Prahlad et al. | 711/162 |
| 2010/0205421 A1 * | 8/2010 | Campbell et al. | 713/2 |
| 2011/0178972 A1 * | 7/2011 | Navarro et al. | 706/47 |
| 2012/0179861 A1 * | 7/2012 | Mizushima | 711/103 |

* cited by examiner

*Primary Examiner* — Tuan Thai
(74) *Attorney, Agent, or Firm* — Lowenstein Sandler LLP

(57) ABSTRACT

A system and method are disclosed for servicing requests to create live snapshots of a plurality of virtual disks in a virtualized environment. In accordance with one example, a computer system issues one or more commands to create a first snapshot of a first virtual disk of a virtual machine and a second snapshot of a second virtual disk of the virtual machine while the virtual machine is running. The computer system determines that the creating of the second snapshot failed and, in response, destroys the first snapshot.

20 Claims, 3 Drawing Sheets

LIVE SNAPSHOTS OF MULTIPLE VIRTUAL DISKS

TECHNICAL FIELD

This disclosure relates to computer systems, and more particularly, to live snapshotting in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method by which a computer system may service requests to create live snapshots of a plurality of virtual disks of one or more virtual machines (VMs). A snapshot of a virtual disk of a VM is a file that captures the state of the virtual disk at a particular point in time. A live snapshot of a virtual disk of a VM is a snapshot that is taken while the VM is executing (i.e., a snapshot that is taken without first shutting down the VM).

In accordance with one example, a computer system issues, in response to such a request, one or more commands to create live snapshots of each of the plurality of virtual disks. The computer system determines whether creation of any of the live snapshots failed, and if so, destroys any live snapshots that were successfully created and returns a value (e.g., a failure code, an error message, etc.) to the sender of the request indicating that none of the live snapshots were created. Alternatively, if all of the live snapshots were successfully created, one or more values are returned to the sender that indicate that the request was serviced and provide references (e.g., addresses, file names, etc.) to the live snapshots.

The present disclosure can thus enable a computer system to create a consistent set of live snapshots of a plurality of virtual disks, without requiring shutdown of the virtual machine(s) to which the virtual disks belong. As a result, examples of the present disclosure enable the snapshotting of an executing virtual machine having multiple virtual disks, with a guarantee that all of the virtual disks have been snapshotted correctly and at the same point in time. Similarly, the present disclosure can enable the snapshotting of two or more executing virtual machines, with a guarantee that all of the virtual machines have been snapshotted correctly and at the same point in time.

Figure 1:
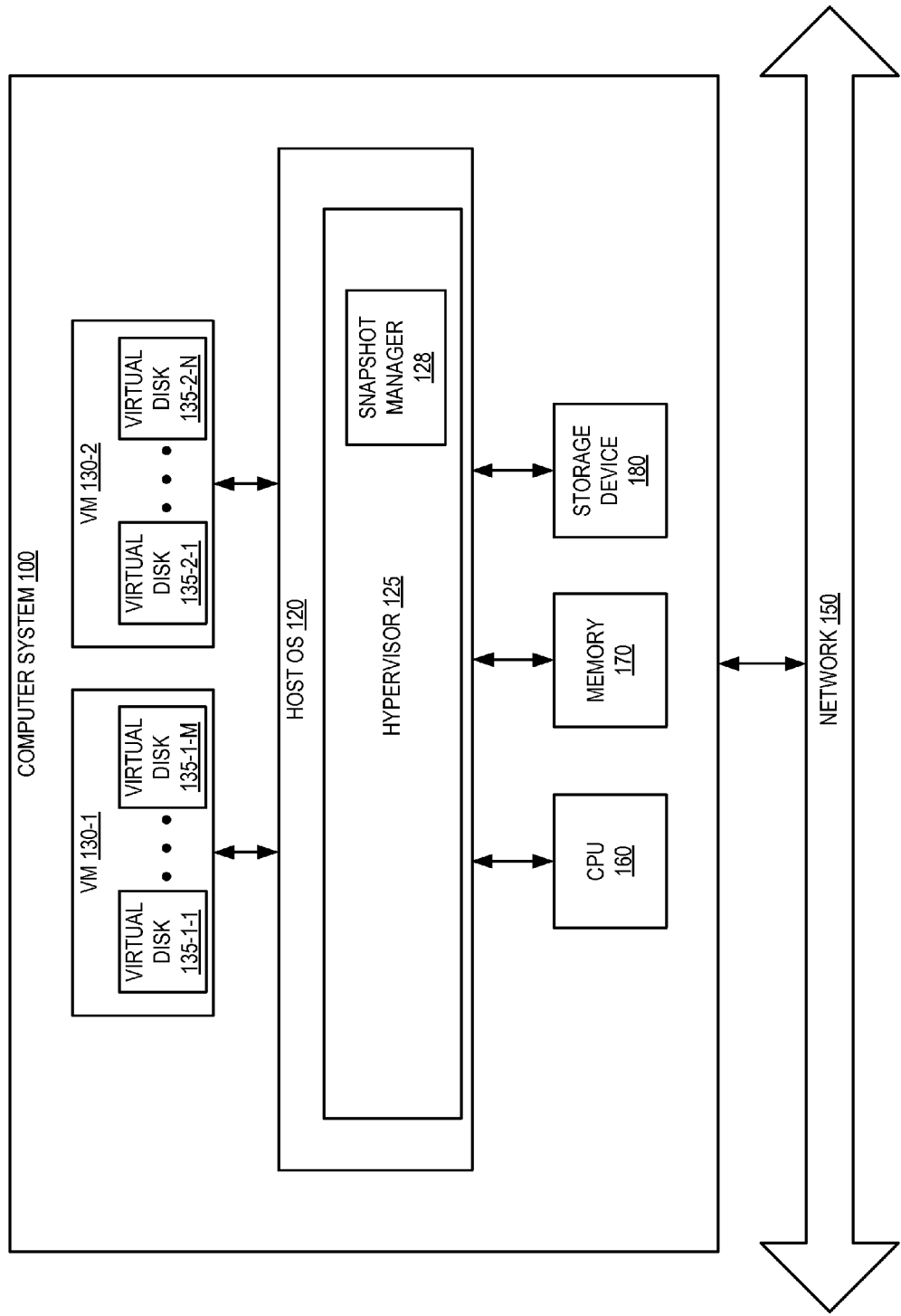
FIG. 1 depicts an illustrative system architecture, in accordance with the present disclosure.

FIG. 1 depicts an illustrative architecture of a computer system 100, in accordance with an example of the present invention. It should be noted that other architectures for computer system 100 are possible, and that examples of a system utilizing the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, and a storage device 180 (e.g., one or more magnetic hard disk drives, one or more Universal Serial Bus [USB] solid-state drives, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). It should be noted that the fact that a single CPU 160 is depicted in FIG. 1 is merely illustrative, and that in some other examples computer system 100 may comprise a plurality of CPUs 160. Similarly, in some other examples computer system 100 may comprise a plurality of storage devices 180.

Computer system 100 runs a host operating system (OS) 120 that manages the hardware resources of the computer system and provides functions such as interprocess communication, scheduling, virtual memory management, and so forth. In one example, host operating system 120 also comprises a hypervisor 125, which provides a virtual operating platform for virtual machines 130-1 and 130-2 and manages execution of virtual machines 130-1 and 130-2. It should be noted that the fact that there are two virtual machines 130 depicted in FIG. 1 is merely illustrative, and that in some examples there may be more than two virtual machines, or a single virtual machine.

Each virtual machine 130 is a software implementation of a machine that executes programs as though it were an actual physical machine. As shown in FIG. 1, virtual machine 130-1 comprises M virtual disks 135-1-1 through 135-1-M, each of which is mapped to a respective file stored on storage device 180, where M is a positive integer. Virtual machine 130-1 also comprises a guest operating system (not depicted in FIG. 1) that manages files and programs within the virtual machine. Similarly, virtual machine 130-2 comprises N virtual disks 135-2-1 through 135-2-N, each of which is mapped to a respective file stored on storage device 180, where N is a positive integer that may or may not be equal to M. Virtual machine 130-2, like virtual machine 130-1, also comprises a guest operating system (not depicted in FIG. 1) that manages files and programs within the virtual machine.

In accordance with one example, hypervisor 125 includes a snapshot manager 128 that is capable of receiving requests to create live snapshots of multiple virtual disks, issuing commands to create live snapshots, determining whether creation of particular snapshots failed, destroying snapshots that were successfully created, and informing senders of snapshot requests of failure or success, as appropriate. Some operations of snapshot manager 128 are described in detail below with respect to the method of FIG. 2.

It should be noted that in some alternative examples, hypervisor 125 may be external to host OS 120, rather than embedded within host OS 120. It should further be noted that in some alternative examples, snapshot manager 128 may be a module of host OS 120, rather than a module of hypervisor 125.

Figure 2:
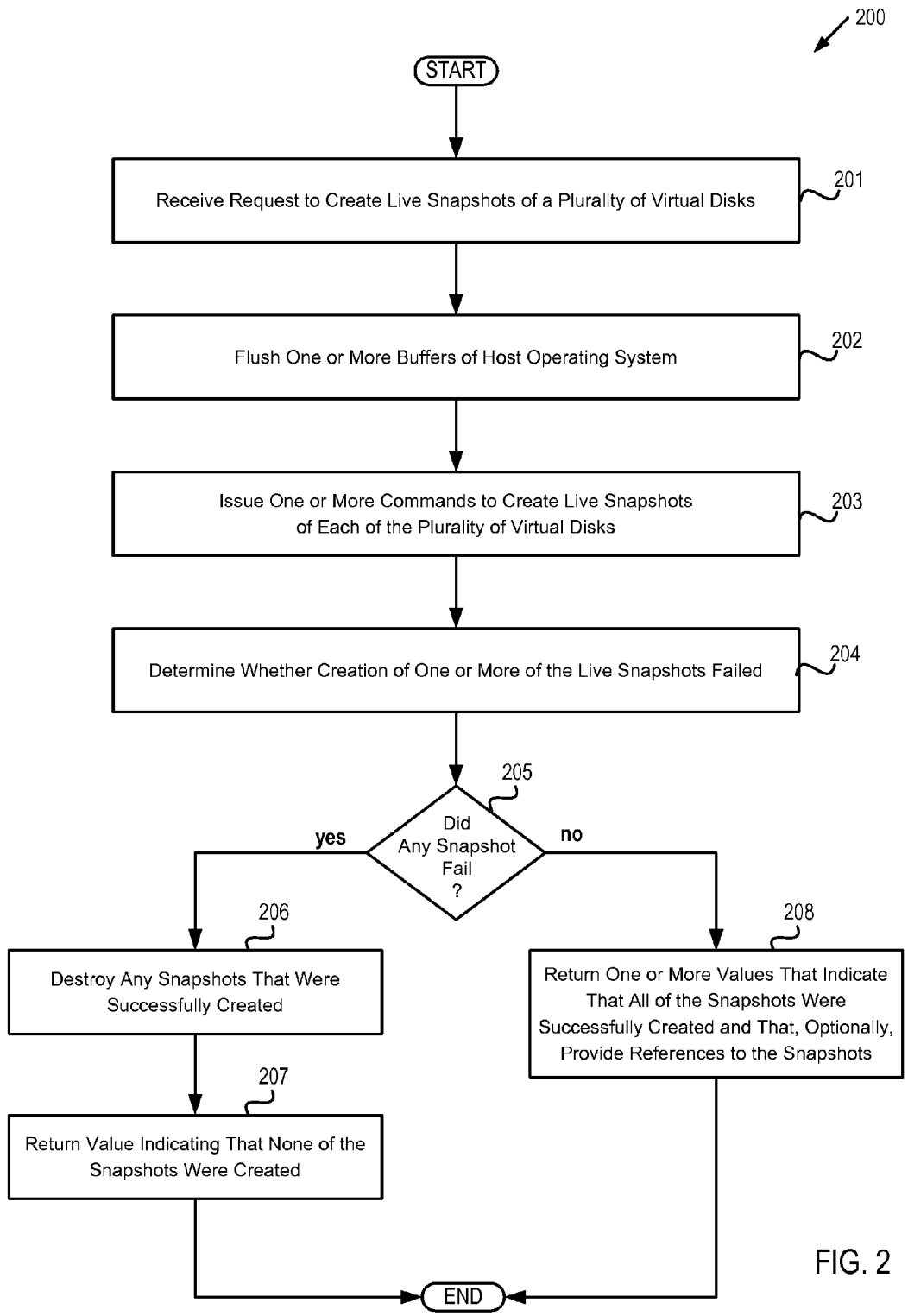
FIG. 2 depicts a flow diagram of one example of a method by which a computer system services a request to create live snapshots of a plurality of virtual disks.

FIG. 2 depicts a flow diagram of one example of a method 200 by which a computer system services a request to create live snapshots of a plurality of virtual disks. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine. It should be noted that blocks depicted in FIG. 2 can be performed simultaneously or in a different order than that depicted.

It should further be noted that the plurality of virtual disks may all belong to a single executing virtual machine, or they may belong to a plurality of executing virtual machines. In the latter case, the plurality of virtual disks may be distributed among the plurality of virtual machines in any possible combination (e.g., one virtual disk belonging to a first VM and one virtual disk belonging to a second VM; two virtual disks belonging to a first VM and four virtual disks belonging to a second VM; three virtual disks belonging to a first VM, one virtual disk belonging to a second VM, and seven virtual disks belonging to a third VM; etc.).

At block 201, a request is received to create live snapshots of a plurality of virtual disks. As noted above, the plurality of virtual disks may all belong to a single executing virtual machine, or may belong to a plurality of executing virtual machines. The request may be submitted by an administrator of computer system 100, or by an application executing on computer system 100, or by some other program (e.g., a system administration-related script that executes on computer system 100, an application that executes on another machine connected to computer system 100 via network 150, etc.). In one example, the request is received by snapshot manager 128.

At block 202, one or more buffers of host operating system 120 are flushed (e.g., the contents of the one or more buffers are discarded, leaving the buffer(s) empty) in preparation for creation of the live snapshots. In one example, a plurality of buffers are flushed, each associated with a respective virtual disk, while in another example, each buffer to be flushed is associated with a respective virtual machine, while in yet another example, a single buffer is flushed. In one example, block 202 is performed by snapshot manager 128, while in another example block 202 is performed by a process executing within a virtual machine in response to a request from host operating system 120.

At block 203, one or more commands are issued to create live snapshots of each of the plurality of virtual disks. In one example, a plurality of commands are issued, each of which is to create a live snapshot of a respective one of the plurality of virtual disks (e.g., a first command for creating a live snapshot of a first virtual disk, a second command for creating a live snapshot of a second virtual disk, etc.), while in some other examples, a single command is issued to create all of the live snapshots, while in yet other examples, a plurality of commands may be issued that do not correspond in a one-to-one fashion with the plurality of virtual disks (e.g., a first command for creating a live snapshot of a first virtual disk and a second virtual disk, a second command for creating a live snapshot of a third virtual disk, etc.). In one example, when the storage device 180 supports native snapshotting (e.g., a capability by which the storage device can create snapshots), the snapshot manager 128 may issue one or more commands to a native snapshotting module on the storage device 180 to create the live snapshots. Alternatively (e.g., when the storage device 180 lacks a native snapshotting capability, etc.), the snapshot manager 128 may issue one or more commands to hypervisor 125 or host OS 120 to create the live snapshots. In one example, snapshot manager 128 may issue a query to storage device 180 to determine whether the storage device supports native snapshotting. In another example, snapshot manager 128 may obtain this information from hypervisor 125 or host OS 120.

In one example, input/output of the virtual machine(s) to which the plurality of virtual disks belong may be frozen during the creation of the snapshots. In addition, requests to the plurality of virtual disks (e.g., read requests, write requests, etc.) may be queued during the creation of the snapshots.

Block 204 determines whether creation of one or more of the live snapshots failed, and block 205 branches based on the determination at block 204. If creation of any of the live snapshots failed, execution proceeds to block 206, otherwise execution continues at block 208. In one example, snapshot manager 128 determines whether creation of a live snapshot failed by checking that the storage area for the live snapshot exists, that the storage area has been properly initialized (e.g., not corrupted, etc.), that the storage area has the appropriate permissions (e.g., read permissions, write permissions, etc.), and so forth.

At block 206, it is determined whether there are any live snapshots that were successfully created by the one or more commands issued at block 203. In one example, hypervisor 125 determines that a live snapshot was successfully created when hypervisor 125 can successfully open the new file or device associated with the snapshot (e.g., in order to store a change [or "delta"] to the snapshot, etc.). If so, such live snapshots are destroyed. In one example, block 206 is performed by snapshot manager 128.

At block 207, a value (e.g., a failure code, an error message, etc.) is returned to the sender of the request indicating that none of the live snapshots were created, while at block 208, one or more values are returned to the sender that indicate that the request was serviced and that, optionally, provide references (e.g., addresses, file names, etc.) to the live snapshots. In one example, blocks 207 and 208 are performed by snapshot manager 128.

Figure 3:
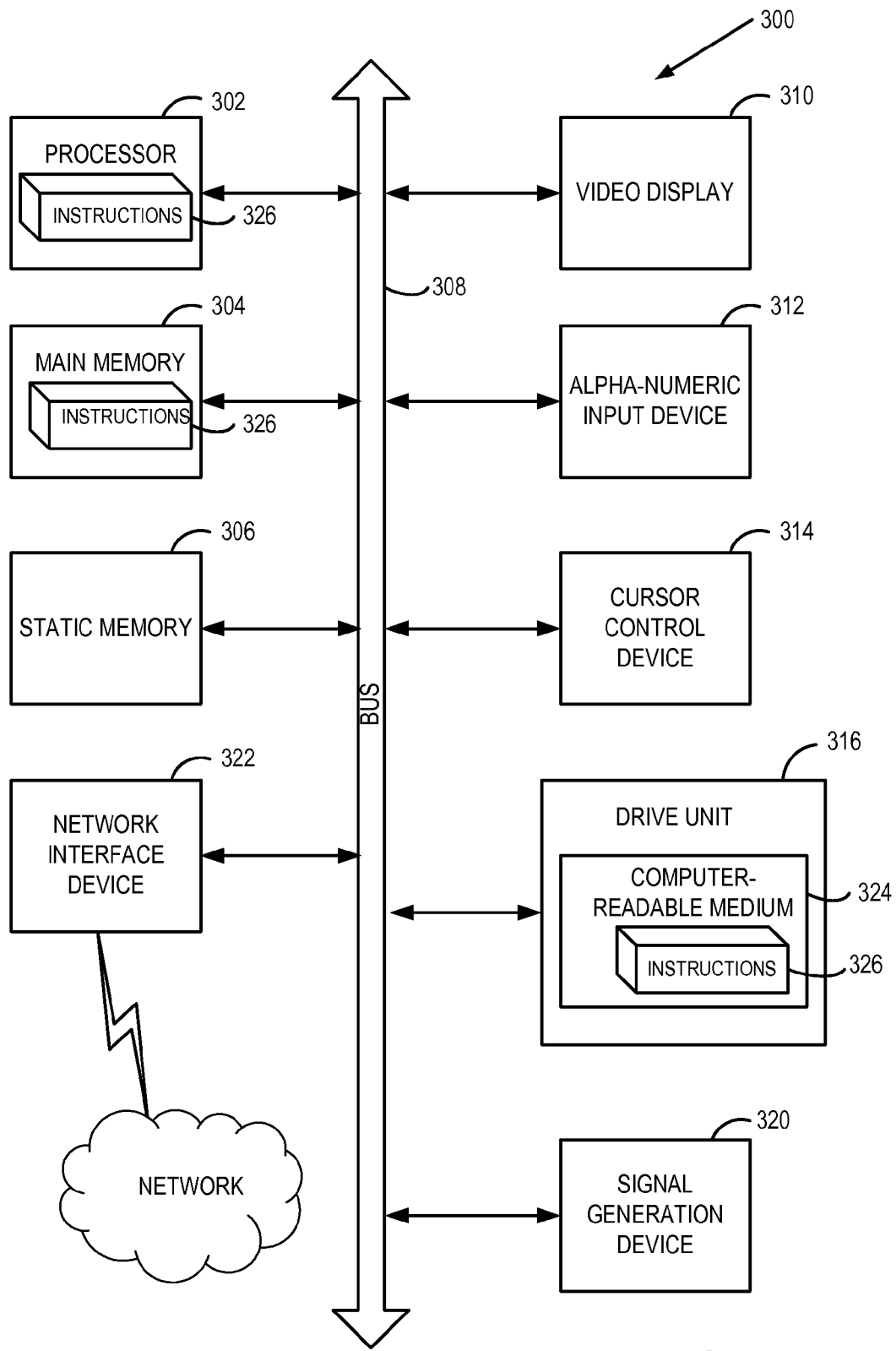
FIG. 3 depicts a block diagram of an illustrative computer system operating in accordance with examples of the invention.

FIG. 3 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the methods of FIGS. 2 and 3, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "issuing", "determining", "destroying", "flushing", "freezing", "queueing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   issuing, by a processor, one or more commands to create a first snapshot of a first virtual disk of a virtual machine and a second snapshot of a second virtual disk of the virtual machine while the virtual machine is running;
   determining, by the processor, that the creating of the second snapshot failed; and
   destroying, by the processor, the first snapshot in response to the determining.

2. The method of claim 1 wherein the issuing of the one or more commands is in response to a request to create snapshots of the first virtual disk and the second virtual disk.

3. The method of claim 2 further comprising returning a value that indicates to a sender of the request that neither of the snapshots were created.

4. The method of claim 1 wherein the first virtual disk is stored on a storage device, and wherein the first snapshot is created by the storage device.

5. The method of claim 1 wherein the first snapshot is created by a hypervisor of the processor.

6. The method of claim 1 wherein the first snapshot is created by a host operating system of the processor.

7. The method of claim 1 further comprising:
   flushing, by the processor, a buffer of a host operating system of the processor prior to the issuing of the one or more commands;
   freezing, by the processor, input/output of the virtual machine during the creating of the first snapshot; and
   queuing, by the processor, requests to the first virtual disk during the creating of the first snapshot.

8. The method of claim 7 wherein the freezing is performed by a process executing within the virtual machine in response to a request from a host operating system of the processor.

9. The method of claim 7 wherein the buffer is flushed by a process executing within the virtual machine in response to a request from a host operating system of the processor.

10. An apparatus comprising:
    a memory to store a first virtual machine and a second virtual machine; and
    a processor to:
    run the first virtual machine and the second virtual machine;
    issue one or more commands to:
    create a first snapshot of a first virtual disk of the first virtual machine while the first virtual machine is running, and
    create a second snapshot of a second virtual disk of the second virtual machine while the second virtual machine is running;
    determine that the creating of the second snapshot failed; and
    destroy the first snapshot in response to the determining.

11. The apparatus of claim 10 wherein the issuing of the one or more commands is in response to a request to create snapshots of the first virtual disk and the second virtual disk.

12. The apparatus of claim 11 wherein the processor is further to return a value that indicates to a sender of the request that neither of the snapshots were created.

13. The apparatus of claim 10 wherein the first virtual disk is stored on a storage device, and wherein the first snapshot is created by the storage device.

14. The apparatus of claim 10 wherein the processor is further to run a hypervisor, and wherein the first snapshot is created by the hypervisor.

15. The apparatus of claim 10 wherein the processor is further to run a host operating system, and wherein the first snapshot is created by the host operating system.

16. The apparatus of claim 10 wherein the processor is further to:
    run a host operating system;
    flush a buffer of the host operating system prior to the issuing of the one or more commands;
    freeze input/output of the first virtual machine during the creating of the first snapshot; and
    queue requests to the first virtual disk during the creating of the first snapshot.

17. A non-transitory computer readable storage medium, having instructions stored therein, which when executed, cause a processor to:
    issue, by the processor, one or more commands to:
    create a first snapshot of a first virtual disk of a first virtual machine while the first virtual machine is running, and
    create a second snapshot of a second virtual disk of a second virtual machine while the second virtual machine is running;
    determine, by the processor, that the creating of the second snapshot failed; and
    destroy, by the processor, the first snapshot in response to the determining.

18. The non-transitory computer readable storage medium of claim 17 wherein the issuance of the one or more commands is in response to a request to create snapshots of the first virtual disk and the second virtual disk.

19. The non-transitory computer readable storage medium of claim 18 wherein the processor is further to:
    return a value that indicates to a sender of the request that neither snapshot was created.

20. The non-transitory computer readable storage medium of claim 17 wherein the first virtual disk is stored on a storage device, and wherein the first snapshot is created by the storage device.

* * * * *